US009323425B2

(12) United States Patent
Robinson et al.

(10) Patent No.: US 9,323,425 B2
(45) Date of Patent: *Apr. 26, 2016

(54) DEFERRED DATA POST

(71) Applicant: Oracle International Corporation, Redwood Shores, CA (US)

(72) Inventors: Andrew Robinson, Lone Tree, CO (US); Matthew Cooper, Centennial, CO (US); Michael Elges, Littleton, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 14/147,317

(22) Filed: Jan. 3, 2014

(65) Prior Publication Data

US 2014/0123058 A1 May 1, 2014

Related U.S. Application Data

(63) Continuation of application No. 13/276,732, filed on Oct. 19, 2011, now Pat. No. 8,650,251.

(51) Int. Cl.
| | |
|---|---|
| *G06F 15/16* | (2006.01) |
| *G06F 3/0482* | (2013.01) |
| *H04L 29/06* | (2006.01) |
| *H04L 12/801* | (2013.01) |
| *H04L 29/08* | (2006.01) |
| *G06F 17/30* | (2006.01) |

(52) U.S. Cl.
CPC ........ *G06F 3/0482* (2013.01); *G06F 17/30899* (2013.01); *H04L 29/06* (2013.01); *H04L 29/08072* (2013.01); *H04L 47/12* (2013.01)

(58) Field of Classification Search
CPC .......................... H04L 29/06; H04L 29/08072
USPC ......................................... 709/203, 220, 232
See application file for complete search history.

(56) References Cited

U.S. PATENT DOCUMENTS

| | | | |
|---|---|---|---|
| 5,986,657 | A | 11/1999 | Berteig et al. |
| 7,360,167 | B2 | 4/2008 | Hennum et al. |
| | | (Continued) | |

OTHER PUBLICATIONS

Author Unknown, "Collapsible Panel Demonstration", ASP.net AJAX, http://www.asp.net/ajax/ajaxcontroltoolkit/samples/CollapsiblePanel/CollapsiblePanel.aspx, retrieved from the internet Oct. 14, 2011, Copyright 2006, 2 pages.

(Continued)

*Primary Examiner* — Khanh Dinh
(74) *Attorney, Agent, or Firm* — Kilpatrick Townsend & Stockton LLP (57) ABSTRACT

Various methods, systems, and computer program products for deferring transmission of data related to collapsing a collapsible display panel are presented. The collapsible display panel may be collapsed. State data that indicates the collapsible display panel has been collapsed may be generated. A determination that no non-state change data corresponding to the collapsible display panel needs to be transferred to a server may be made. In response, the state data may be stored at least until non-state data is to be transmitted to the server. At some time after storing the state data, non-state data that is to be transmitted to the server may be identified. In response to identifying the non-state data that is to be transmitted to the server, the state data and the non-state data may be transmitted to the server together.

20 Claims, 7 Drawing Sheets

(56) References Cited

U.S. PATENT DOCUMENTS

| | | | |
|---|---|---|---|
| 7,360,175 B2 | 4/2008 | Gardner et al. | |
| 7,363,572 B2 * | 4/2008 | Sidenblad | H04L 29/06 714/758 |
| 7,412,488 B2 * | 8/2008 | Jha | H04L 29/06 370/395.52 |
| 7,420,931 B2 * | 9/2008 | Nanda | H04L 29/06 370/252 |
| 7,543,247 B2 | 6/2009 | Quaranta | |
| 7,620,911 B2 | 11/2009 | Webb | |
| 7,908,586 B1 | 3/2011 | Blas | |
| 8,417,852 B2 | 4/2013 | Rajagopalan et al. | |
| 8,650,251 B2 * | 2/2014 | Robinson | G06F 3/0482 709/203 |
| 8,817,025 B1 * | 8/2014 | Urbach | G06T 15/005 345/419 |
| 2004/0246974 A1 * | 12/2004 | Gyugyi | H04L 29/06 370/395.31 |
| 2004/0257986 A1 * | 12/2004 | Jha | H04L 29/06 370/229 |
| 2004/0258075 A1 | 12/2004 | Sidenblad et al. | |
| 2005/0192953 A1 | 9/2005 | Neale et al. | |
| 2013/0042077 A1 | 2/2013 | Mannava et al. | |
| 2013/0103737 A1 * | 4/2013 | Robinson | G06F 3/0482 709/203 |

OTHER PUBLICATIONS

Author Unknown, "Javascript Div. Collapse Style Using Display None", Ezine ASP.Net, http://programming.top54u.com/post/Javascript-Div-Collapse-Style-Using-Display-None.aspx, retrieved from the internet Oct. 14, 2011, Jun. 27, 2008, 4 pages.

U.S. Appl. No. 13/276,732, Notice of Allowance mailed on Oct. 7, 2013, 10 pages.

* cited by examiner

DEFERRED DATA POST

CROSS-REFERENCE TO RELATED APPLICATIONS

This application is a Continuation of U.S. patent application Ser. No. 13/276,732 filed Oct. 19, 2011 and entitled "Deferred Data Post," the entire disclosure of which is hereby incorporated by reference for all purposes as if fully set forth herein.

BACKGROUND

Collapsible display panels (also referred to as collapsible panels) may be used to display information to users in a compact and/or organized manner. A set of collapsible panels may allow for various portions of a dataset to be displayed to the user at a time. Each collapsible panel may display data that is part of a larger dataset. Portions of the dataset may be displayed while other portions of the dataset are not displayed based upon which collapsible panels are expanded and which collapsible panels are collapsed.

Collapsible panels may be used on a web page. As such, to decrease the amount of data that needs to be transmitted from a server across a network to a computerized device, portions of the dataset not to be initially displayed may not, at least initially, be transmitted to the computerized device. When a user indicates that a collapsible panel linked with a portion of the dataset not initially displayed is to be displayed, this portion of the dataset may be retrieved from the server.

Typically, whenever a user provides input indicating that a collapsible panel is to be collapsed, data is transmitted between the computerized device and the server such that the server is made aware of the state of the collapsible panels displayed by the computerized device. Such communication between the computerized device and the server may be inefficient. For example, performance of the collapsible display panel, the computerized device, the network, and/or the server may be adversely affected by the communication that may be required when collapsible panels are collapsed.

SUMMARY

Various arrangements for deferring a transmission of data related to collapsing a collapsible display panel are presented. In some embodiments, a method for deferring a transmission of data related to collapsing a collapsible display panel. The method may include collapsing the collapsible display panel. The method may include generating state data that indicates the collapsible display panel has been collapsed. The method may include determining that no non-state data needs to be transmitted to a server. The method may include, in response to determining that no non-state data needs to be transmitted to the server, storing, by the computerized device, the state data at least until non-state data is to be transmitted to the server. The method may include, after storing the state data, identifying non-state data that is to be transmitted to the server. The method may include in response to identifying the non-state data that is to be transmitted to the server, transmitting to the server, the state data and the non-state data together.

In embodiments of such a method, one or more of the following may be present: The method may include, after collapsing the collapsible display panel, receiving input that indicates to expand the collapsible display panel. The method may include, in response to receiving input that indicates to expand the collapsible display panel, determining that the state data has not been transmitted to the server. The method may include, in response to determining that the state data has not been transmitted to the server, expanding the collapsible display panel without retrieving data corresponding to the collapsible display panel from the server. Transmitting to the server the state data and the non-state data may comprise transmitting state data corresponding to a plurality of collapsible display panels together. The method may include, after collapsing the collapsible display panel and transmitting the state data, receiving input that indicates to expand the collapsible display panel that is collapsed. The method may include, retrieving from the server, a portion of a dataset corresponding to the collapsible display panel. The non-state data may comprise data provided by a user. The collapsible display panel may be displayed within an Internet browser. The method may include determining that the non-state data is valid, wherein transmitting the non-state data to the server is performed in response to determining the non-state data is valid. The collapsible display panel may be one of a plurality of collapsible display panels that are each configured to display a portion of a dataset stored by the server. The method may further comprise receiving a webpage that comprises the plurality of display panels.

In some embodiments, a computer program product residing on a non-transitory processor-readable medium and comprising processor-readable instructions is presented. The processor-readable instructions may be configured to cause a processor to cause a collapsible display panel to be collapsed. The processor-readable instructions may be configured to cause the processor to generate state data that indicates the collapsible display panel has been collapsed. The processor-readable instructions may be configured to cause the processor to determine that no non-state data needs to be transmitted to a server. The processor-readable instructions may be configured to cause the processor to, in response to determining that no non-state data needs to be transmitted to the server, cause, at least until non-state data is to be transmitted to the server, the state data to be stored. The processor-readable instructions may be configured to cause the processor to, after storing the state data, identify non-state data that is to be transmitted to the server. The processor-readable instructions may be configured to cause the processor to, in response to identifying the non-state data that is to be transmitted to the server, cause the state data and the non-state data to be transmitted to the server.

Embodiments of such a computer program may include one or more of the following: The processor-readable instructions may be configured to cause the processor to, after collapsing the collapsible display panel, cause input to be received that indicates to expand the collapsible display panel. The processor-readable instructions may be configured to cause the processor to, in response to receiving input that indicates to expand the collapsible display panel, determine that the state data has not been transmitted to the server. The processor-readable instructions may be configured to cause the processor to, in response to determining that the state data has not been transmitted to the server, cause the collapsible display panel to be expanded without retrieving data corresponding to the collapsible display panel from the server. The processor-readable instructions configured to cause the processor to cause the state data and the non-state data to be transmitted to the server may comprise additional processor-readable instructions configured to cause state data corresponding to a plurality of collapsible display panels to be transmitted together. The processor-readable instructions may be configured to cause the processor to, after collapsing the collapsible display panel and transmitting the state data, cause input to be received that indicates to expand the collapsible display panel that is collapsed. The processor-readable instructions may be configured to cause the processor to cause a portion of a dataset corresponding to the collapsible display panel to be retrieved from the server. Non-state data may comprise data provided by a user. The collapsible display panel may be displayed within an Internet browser. The processor-readable instructions may be configured to cause the processor to determine that the non-state data is valid, wherein transmitting the non-state data to the server is performed in response to determining the non-state data is valid. The collapsible display panel may be one of a plurality of collapsible display panels that are each configured to display a portion of a dataset stored by the server.

In some embodiments, a system for deferring a transmission of data related to collapsing a collapsible display panel is presented. The system may include a computer system having a processor and a memory communicatively coupled with and readable by the processor and having stored therein processor-readable instructions. When executed by the processor, the instructions may cause the processor to cause the collapsible display panel to be collapsed. When executed by the processor, the instructions may cause the processor to generate state data that indicates the collapsible display panel has been collapsed. When executed by the processor, the instructions may cause the processor to determine that no non-state data needs to be transmitted to a server. When executed by the processor, the instructions may cause the processor to, in response to determining that no non-state data needs to be transmitted to the server, cause, at least until non-state data is to be transmitted to the server, the state data to be stored. When executed by the processor, the instructions may cause the processor to, after storing the state data, identify non-state data that is to be transmitted to the server. When executed by the processor, the instructions may cause the processor to, in response to identifying the non-state data that is to be transmitted to the server, cause the state data and the non-state data to be transmitted to the server.

Embodiments of such a system may include one or more of the following: The collapsible display panel may be one of a plurality of collapsible display panels that are each configured to display a portion of a dataset stored by the server. When executed by the processor, the instructions may cause the processor to, after collapsing the collapsible display panel, cause input to be received that indicates to expand the collapsible display panel. When executed by the processor, the instructions may cause the processor to, in response to receiving input that indicates to expand the collapsible display panel, determine that the state data has not been transmitted to the server. When executed by the processor, the instructions may cause the processor to, in response to determining that the state data has not been transmitted to the server, cause the collapsible display panel to be expanded without retrieving data corresponding to the collapsible display panel from the server. The processor-readable instructions configured to cause the processor to cause the state data and the non-state data to be transmitted to the server may comprise additional processor-readable instructions configured to cause state data corresponding to a plurality of collapsible display panels to be transmitted together.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Collapsible display panels (also referred to as collapsible panels) may be used to display information in a compact and/or organized manner. A collapsible panel may allow for various portions of a dataset to be displayed at a time. Each collapsible panel may correspond with a category of the dataset (e.g., a dataset of car parts may have a collapsible panel for engine parts and a collapsible panel for suspension parts). Each collapsible panel may be expanded, such that the portion of the dataset associated with that collapsible panel is displayed, or the collapsible panel may be collapsed, such that the portion of the dataset associated with that collapsible panel is not displayed. The computerized device may notify the server whenever a collapsible panel is expanded and/or collapsed. At least some such notifications may not be efficient because the notifications result in data being transmitted between the computerized device and the server via one or more networks.

Rather than state data being transmitted between the computerized device and a server that indicates that a collapsible panel displayed by the computerized device has been collapsed, such state data may be stored by the computerized device until other data, referred to as non-state data, is to be transmitted to the server. As such, the state data may be stored until non-state data is to be transmitted to the server; at that time, both the non-state data and the state data are transmitted to the server. As such, rather than at least two pieces of data being transmitted to the server independently, the two pieces of data may be transmitted to the server together. Accordingly, the performance of the collapsible display panel, the computerized device, the network, and/or the server may be improved by decreasing the amount of communication between the computerized device and server.

When state data is transmitted to the server by the computerized device may depend on the actions of a user of the computerized device. If the user collapsed a collapsible panel, whether non-state data needs to be transmitted to the server may correspond to whether the user has added, modified, or deleted data within the collapsible panel. Non-state data may refer to data provided to the computerized device by the user. Non-state data may also refer to other forms of data not related to the state of the collapsible panel, which requires transmission from the computerized device to the server. As an example, a collapsible panel may have one or more data fields in which the user is permitted to add, delete, and/or modify data. If the user adds, deletes, and/or modifies data, this non-state data may be transmitted to the server when the user collapses the collapsible panel. Since non-state data is being transmitted to the server, the state data, which indicates that the collapsible panel has been collapsed, may be transmitted to the server together with the non-state data. Transmitting the state data and the non-state data "together" refers to the state data and non-state data being transmitted in a group of one or more data packets approximately concurrently (e.g., in contiguous data packets).

If the user has collapsed a collapsible panel without adding, deleting, or modifying data present within the collapsible panel, no non-state data may need to be transmitted to the server. As such, rather than transmitting only the state data to the server, the state data is stored until other non-state data needs to be transmitted to the server. This may involve waiting until the user provides additional and/or modified data to another collapsible panel or non-state data not related to a collapsible panel needs to be transmitted to the server. When the non-state data is to be transmitted to the server, the state data corresponding to the earlier collapsed panel may be transmitted together with the non-state data to the server. The need for a transmission of only state data from the computerized device to the server may be decreased or eliminated. In some embodiments, multiple pieces of state data (e.g., related to multiple collapsible panels) may be stored by the computerized device until transmitted to the server together with non-state data.

Figure 1:
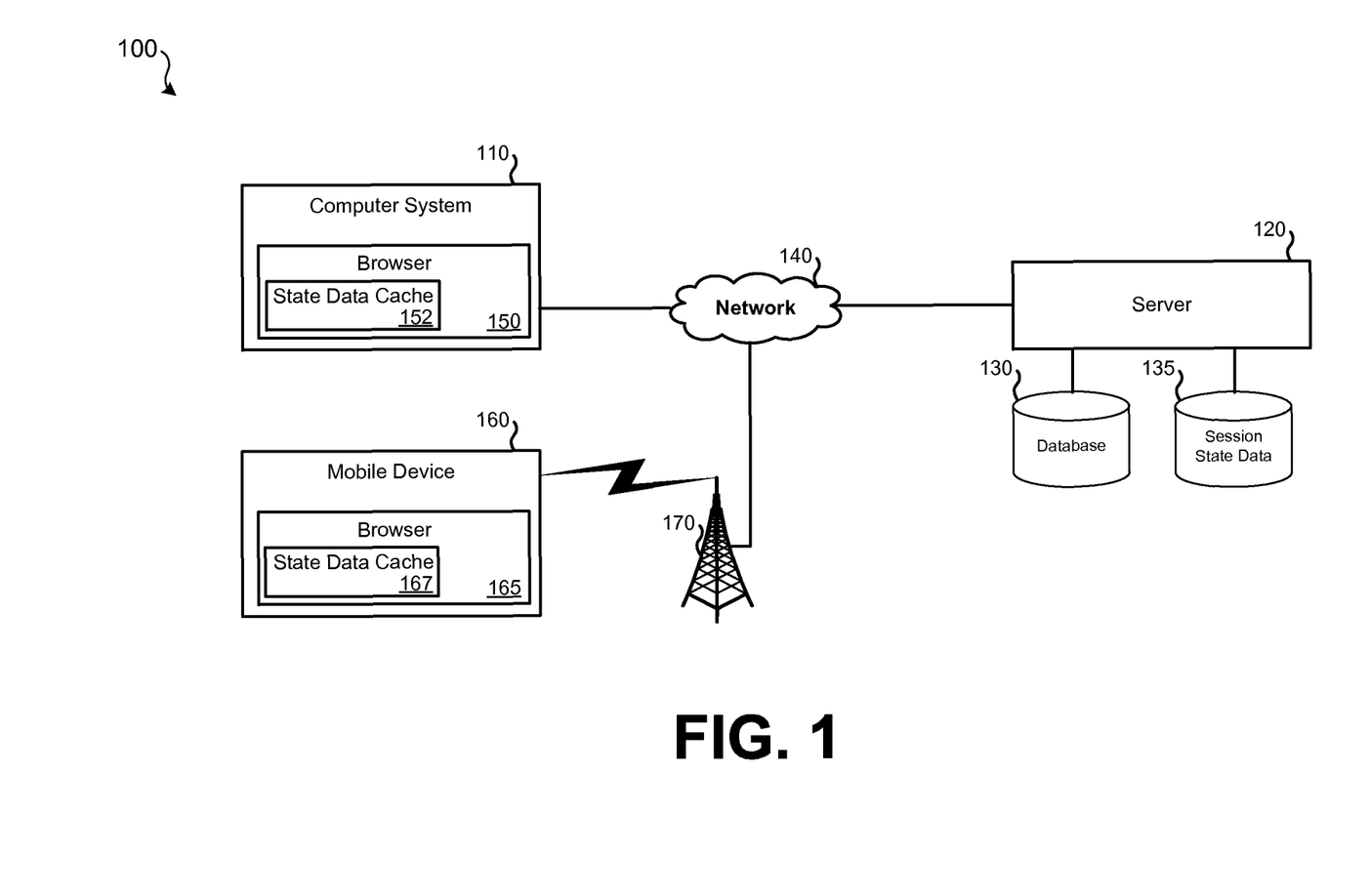
FIG. 1 illustrates an embodiment of a system configured to use collapsible panels.

FIG. 1 illustrates an embodiment of a system 100 configured to use collapsible panels. System 100 may include computer system 110, server 120, database 130, session state database 135, network 140, browser 150, mobile device 160, and wireless network 170. Computer system 110 and mobile device 160 represent two types of computerized devices. While in system 100, two computerized devices are illustrated, it should be understood that fewer or more computerized devices, including additional computer systems, mobile devices, and/or other types of computerized devices may be present.

Computer system 110 may be in communication with server 120 via network 140. Computer system 110 may represent a computer system that is operated by a user to perform actions such as viewing and/or interacting with a webpage. Computer system 110 may include various components. For example, various embodiments of computer system 110 are described in relation to computer system 700 of FIG. 7. As such, a user may view webpages using a display device of computer system 110. Further, the user may provide input via one or more input devices of computer system 110. Browser 150 may be executed by computer system 110. Browser 150 may permit a user to interact with various webpages. Browser 150 may use Oracle's application development framework (ADF). Dynamic HTML, JAVASCRIPT, and AJAX may be used to display such webpages. In some embodiments, FLASH may be used. Computer system 110 via a browser 150 and network 140 may retrieve one or more webpages from server 120. Browser 150 may permit a user, via computer system 110, to interact with various webpages. Browser 150 may contain state data cache 152. State data cache 152 may be used to, at least temporarily, store state data at least until the state data is transmitted to server 120. Following state data being transmitted from computer system 110 to server 120, the state data may be cleared from state data cache 152.

Server 120 may represent a computer system that is configured to function as a web server to provide webpages to various computer systems using network 140. Server 120 may use Oracle's application development framework (ADF). Server 120 may serve one or more webpages that contain one or more collapsible panels. Each collapsible panel of a webpage may be configured to display a portion of a dataset. Such a dataset may be stored using one or more databases, such as database 130. Besides displaying a portion of the dataset, one or more collapsible panels may be configured to receive data from a user. Such data may be received by server 120 and stored using one or more databases, such as database 130. When initially transmitted from server 120 to computer system 110, one or more collapsible panels of the webpage may be either initially expanded and/or collapsed as displayed to the user. When a collapsible panel is expanded, the data associated with that collapsible panel is configured to be displayed by computer system 110. As such, when the collapsible panel is expanded, the corresponding data is transmitted to computer system 110 for display. When a collapsible panel is collapsed, the data associated with that collapsible panel is configured to not be displayed. As such, the data that corresponds to the collapsible panel may not need to be transmitted from server 120 to computer system 110. Rather, the data that corresponds to the collapsible panel may only be transmitted to computer system 110 from server 120 if a user of computer system 110 requests the collapsible panel be expanded. For example, the user may use an input device of computer system 110, such as a mouse, to click on the collapsed collapsible panel to trigger the collapsible panel to expand.

Session state database 135 may include one or more databases, or other data storage arrangements, in communication with server 120. Session state database 135 may store session information for one or more users that are interacting with server 120 via computerized devices such as computer system 110 and mobile device 160. Session state database 135 may include, possibly for each user, session state data that indicates which collapsible panels of a webpage are expanded and/or which collapsible panels of the webpage are collapsed. As such, if the webpage containing the collapsible panels needs to be reloaded by browser 150 of computer system 110, session state data from session state database 135 may be used to reload the webpage with the appropriate collapsible panels expanded and collapsed. Session state database 135 may be updated using state data received from computerized devices such as computer system 110 and mobile device 160.

Network 140 may be used to communicate between various devices such as computer system 110 and server 120. Network 140 may represent one or more interconnected networks. For example, network 140 may include one or more public networks, such as the Internet. Network 140 may also include one or more private networks, such as a corporate intranet. Wireless network 170 may be used to communicate with one or more mobile devices, such as mobile device 160. Mobile device 160 may be configured to load and interact with webpages. As such, mobile device 160 may communicate with a wireless network 170. Wireless network 170 may be in communication with network 140. In some embodiments, wireless network 170 may be in direct communication with server 120 (e.g., communication may occur between server 120 and mobile device 160 without use of network 140).

Similar to computer system 110, mobile device 160 may execute a browser. Browser 165 may permit a user, via mobile device 160, to interact with various webpages. Such webpages may contain one or more collapsible panels.

Browser 165 may contain, or have access to, state data cache 167. State data cache 167 may be used to, at least temporarily, store state data at least until the state data is transmitted to server 120. Following the state data being transmitted from mobile device 160 to server 120, the corresponding state data may be cleared from state data cache 167.

It should be understood that system 100 may represent a simplified embodiment of a system configured to present collapsible panels. For example, server 120 may be in communication with a large number of computerized devices, which may, in turn, be operated by a large number of users. As such, server 120 may store state data for a large number of users.

Figure 2:
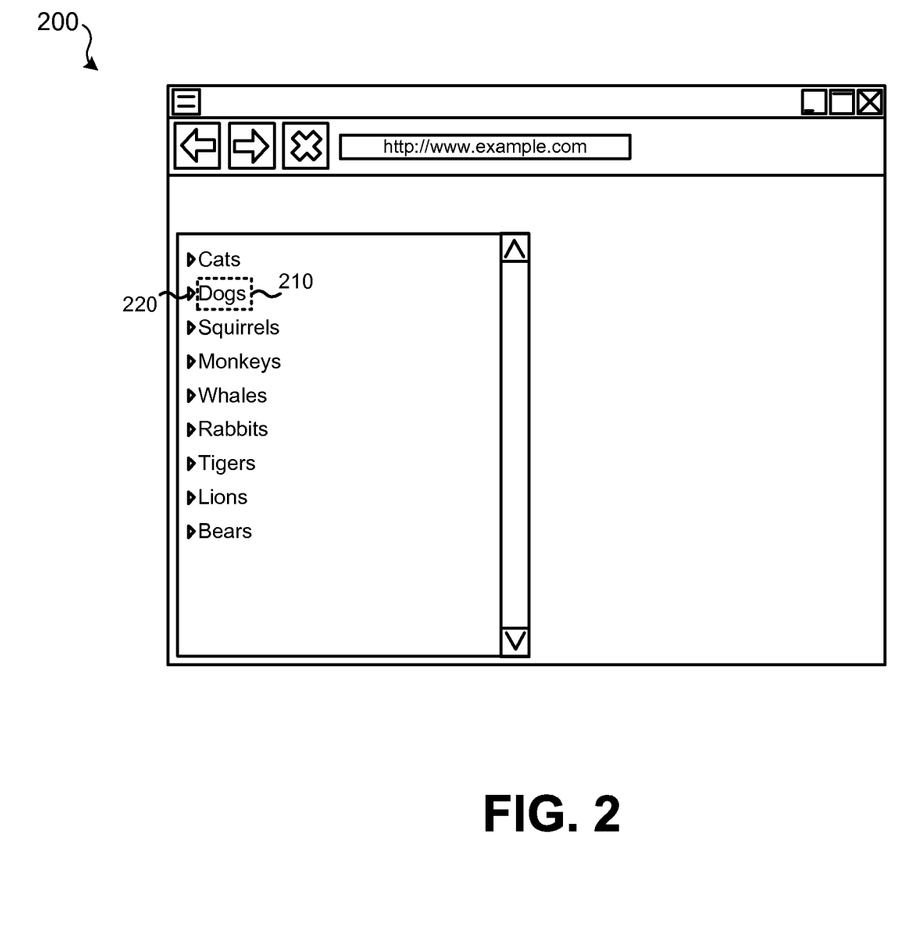
FIG. 2 illustrates an embodiment of collapsed collapsible panels.

FIG. 2 illustrates an embodiment of a browser 200 displaying collapsed collapsible panels. Browser 200 may represent browser 150 and/or browser 165 of FIG. 1, or may represent some other browser. Browser 200 displays nine collapsed collapsible panels, including collapsible panel 210. A dataset may be associated with the nine collapsed collapsible panels of browser 200. Portions of the dataset may be associated with each collapsible panel, such as collapsible panel 210. As an example, the dataset may be data pertaining to various animals. Each collapsible panel may be related to a category of animals. For example, collapsible panel 210 relates to dogs. While, in some embodiments, collapsible panels may be associated with the category of data present within the dataset, collapsible panels do not necessarily need to be organized into coherent categories.

Since each of the nine collapsible panels of browser 200 are collapsed, the portion of the dataset associated with each collapsible panel may not have been transmitted to the computerized device displaying browser 200. For example, the server that transmitted the webpage containing the nine collapsed collapsible panels may be configured to initially transmit each of the collapsible panels as collapsed. While this is true in the illustrated embodiment of browser 200, it should be understood that in other embodiments various collapsible panels may be configured to be initially displayed by browser 200 as expanded. If a collapsible panel is configured to be initially displayed as expanded, the portion of the dataset associated with the collapsible panel may be transmitted to the computerized device executing browser 200 with the webpage. Besides a collapsible panel initially being either collapsed or expanded, a user may provide input to indicate that a collapsible panel should be expanded or collapsed. For example, referring to collapsible panel 210, a user may click (or provide some other form of input) on collapsible panel 210 to indicate that this collapsible panel is to be expanded. Indicator 220 may provide a visual indication (besides the portion of the dataset corresponding to collapsible panel 210 not being displayed) that collapsible panel 210 is collapsed. In some embodiments, additional collapsible panels may be nested within a collapsible panel.

Figure 3:
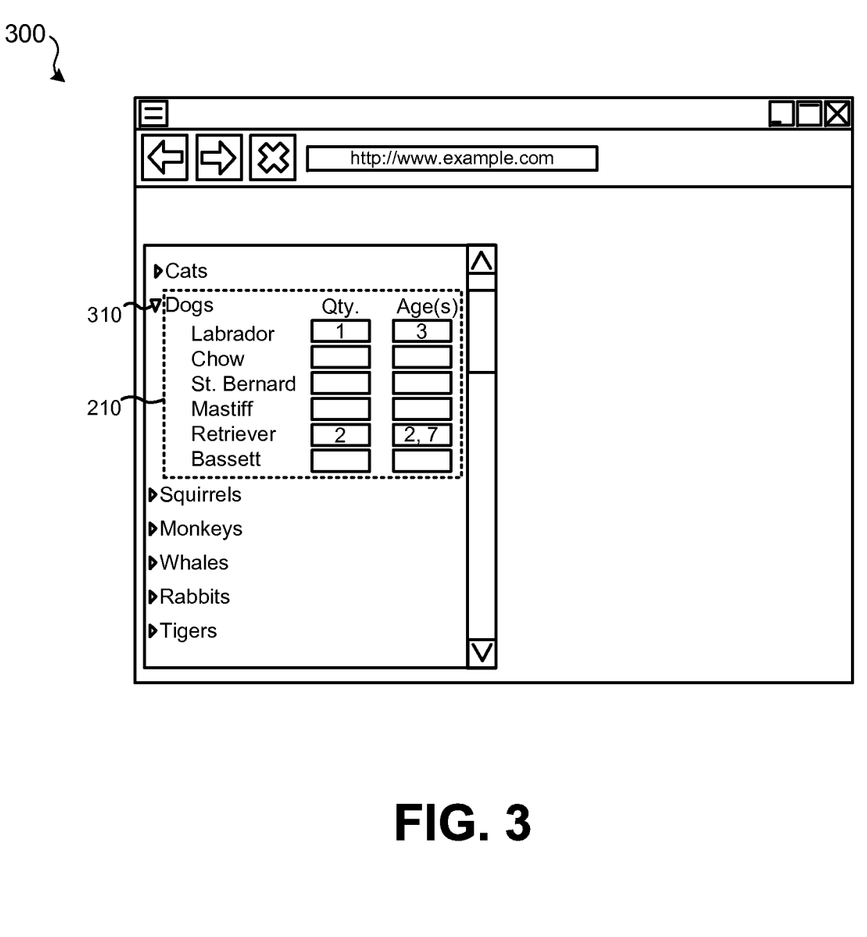
FIG. 3 illustrates an embodiment of an expanded collapsible panel among collapsed collapsible panels.

FIG. 3 illustrates an embodiment of browser 300 with an expanded collapsible panel. Browser 300 may represent an embodiment of browser 200 of FIG. 2 with collapsible panel 210 expanded. As such, browser 300 may represent browser 150 and/or browser 165 of FIG. 1 or may represent some other browser. In browser 300, a user may have provided input indicating that collapsible panel 210 is to be expanded. As such, the portion of the dataset associated with collapsible panel 210 may be transmitted from a server, such as server 120 of system 100, to the computerized device executing browser 300. Collapsed collapsible panel 210 of browser 200 may be displayed in browser 300 as expanded. Indicator 310 may vary from indicator 220 of FIG. 2, to indicate that collapsible panel 210 has been expanded.

The portion of the dataset associated with collapsible panel 210 may include data that is editable and/or uneditable by the user. For example, the dataset may include a listing of various breeds of dogs. The user may not be permitted to edit this listing of breeds of dogs. However, other data of the dataset may be editable by the user. For example, in the illustrated embodiment of FIG. 3, a quantity and age is associated with each breed of dog. Such data of the dataset may be added and/or modified by the user. For example, the user may be permitted to change the quantity and/or age of breeds of dogs listed and/or add a new quantity and/or age to a breed of dog that does not currently have a quantity and/or age associated with it.

Following viewing, editing, and/or adding data to expanded collapsible panel 210 of browser 300, a user may desire to collapse collapsible panel 210. To do this, for example, the user may click on indicator 310 to cause collapsible panel 210 to contract from its expanded state to the collapsed state illustrated in browser 200 of FIG. 2. Collapsing collapsible panel 210 in browser 300 may create state data. This state data may indicate that collapsible panel 210 has been collapsed. This state data, at least eventually, may need to be transmitted to the server that provided the webpage containing collapsible panel 210. Whether this state data is transmitted to the server approximately immediately or at some later point in time may be contingent on whether any non-state data is present to be transmitted to the server. For example, if the user added, modified, or deleted one or more quantities and/or ages of dogs present in expanded collapsible panel 210, this data may constitute non-state data. As such, when collapsible panel 210 is collapsed, the non-state data indicating the changes to the quantity and/or ages of the dogs may be transmitted to the server with the state data indicating that collapsible panel 210 has been collapsed together.

However, if the user did not add, modify, or delete one or more quantities and/or ages of the dogs present in expanded collapsible panel 210 (for example, the user only viewed the data), no non-state data may need to be transmitted to the server (e.g., the displayed quantities and ages of collapsible panel 210 are already stored by the server). The state data that indicates that collapsible panel 210 has been collapsed may be stored until non-state data needs to be transmitted to the server. State data for multiple collapsible panels may be stored until non-state data needs to be transmitted to the server. For example, referring to system 100, a state data cache, such as state data cache 152 of browser 150, may store state data until non-state data needs to be transmitted to the server. Once non-state data needs to be transmitted to the server, all (or some) of this state data present in state data cache 152 may be transmitted to the server. State data cache 152 may then be cleared.

If collapsible panel 210 is collapsed, and no non-state data needs to be transmitted to the server, the state data may be temporarily stored in a state data cache. If the user then reexpands collapsible panel 210 before the state data is transmitted to the server, collapsible panel 210 may be expanded without requiring any communication with the server because all of the information of expanded collapsible panel 210 may still be present on the computerized device. If collapsible panel 210 is re-expanded before the state data that indicates that collapsible panel 210 had been collapsed is transmitted to the server, this state data may be expunged from the state data cache and, as such, may not be transmitted to the server, because such state data is no longer current.

While browser 200 and browser 300 of FIG. 2 and FIG. 3, respectively, contain collapsible panels related to animals, it should be understood that these collapsible panels are for example purposes only. The names and/or content of the collapsible panels may vary. The number of collapsible panels may be greater or fewer. The presentation of the collapsible panels, including how the data associated with the collapsible panel is displayed when the collapsible panel is expanded and how the collapsible panel is displayed when collapsed (e.g., how an associated indicator, such as indicator 220, is presented) may vary. Additional collapsible panels may be nested.

Figure 4:
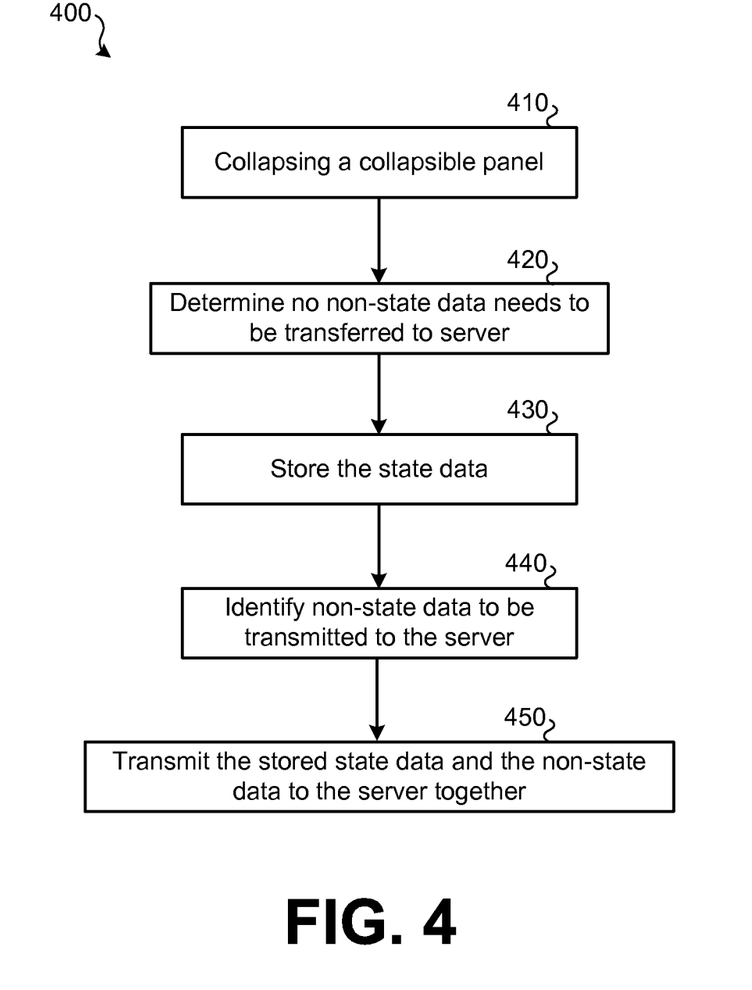
FIG. 4 illustrates an embodiment of a method for deferring a data post linked with collapsing a collapsible display panel that is expanded.

System 100 may be used to allow various collapsible panels to be used as part of web pages by server 120 to various computerized devices, such as computer system 110 and mobile device 160. System 100 may permit collapsible panels such as those displayed in browser 200 and browser 300 of FIG. 2 and FIG. 3, respectively. System 100 may be used to perform various methods involving deferred data posts to a server related to the collapsible panels. FIG. 4 illustrates an embodiment of a method 400 for deferring a data post related to collapsing a collapsible display panel. Method 400 may be performed by system 100. Method 400 may also be performed by some other system for deferring a data post related to a collapsible display panel. Each step of method 400 may be performed by a computerized device, such as a computer system or mobile device, operated by a user.

At step 410, a collapsible panel may be collapsed. The collapsible panel may be present within a webpage being displayed to a user in a browser. The collapsible panel may be collapsed due to input received from the user that indicates the collapsible panel is to be collapsed. Collapsing the collapsible panel may involve data, which may be a portion of the dataset associated with the collapsible panel, no longer being displayed. A title of the collapsible panel may remain displayed when the collapsible panel is collapsed.

At step 420, a determination may be made that no non-state data needs to be transmitted to the server. Determining that no non-state data needs to be transmitted to the server may involve determining the user has not added, modified, and/or deleted any data that corresponds to the collapsible panel (e.g., data within the collapsible panel). As such, the data linked with the collapsible panel stored by the server is current as compared with the non-state data displayed by the browser of the computerized device.

At step 430, state change data that indicates the collapsible panel has been collapsed may be stored locally by the computerized device. For example, referring to FIG. 1, computer system 110 may be executing browser 150. State data that has not been transmitted to server 120 may be stored by state data cache 152. The state change data stored at step 430 may indicate which collapsible panel has been collapsed (e.g., an indicator of the collapsible panel may be stored) and an indication of the collapsed state. As such, despite state data having been generated and the collapsible panel being collapsed at step 410, no data has been transmitted to the server at least since step 410 because only state data is queued for transmission to the server.

At step 440, non-state data may be identified that needs to be transmitted to the server. This may involve non-state data linked with some other collapsible panel or some other portion of the webpage that requires data to be identified. As an example of non-state data, data within a collapsible panel that was added, modified, or deleted by the user may be identified as non-state data.

Once non-state data has been identified at step 440, the non-state data and the state data stored at step 450 may be transmitted to the server together. As such, rather than the state data and the non-state data being transmitted to the server independently, the state data and the non-state data are transmitted to the server together.

In method 400, state data related to one collapsible panel is stored at step 430 until transmission to the server at step 450 with non-state data. In some embodiments, state data related to multiple collapsible panels may be stored until non-state data is identified for transmission to the server. As such, multiple pieces of state data, which may be related to multiple collapsible panels, may be transmitted to the server together with non-state data.

Figure 5:
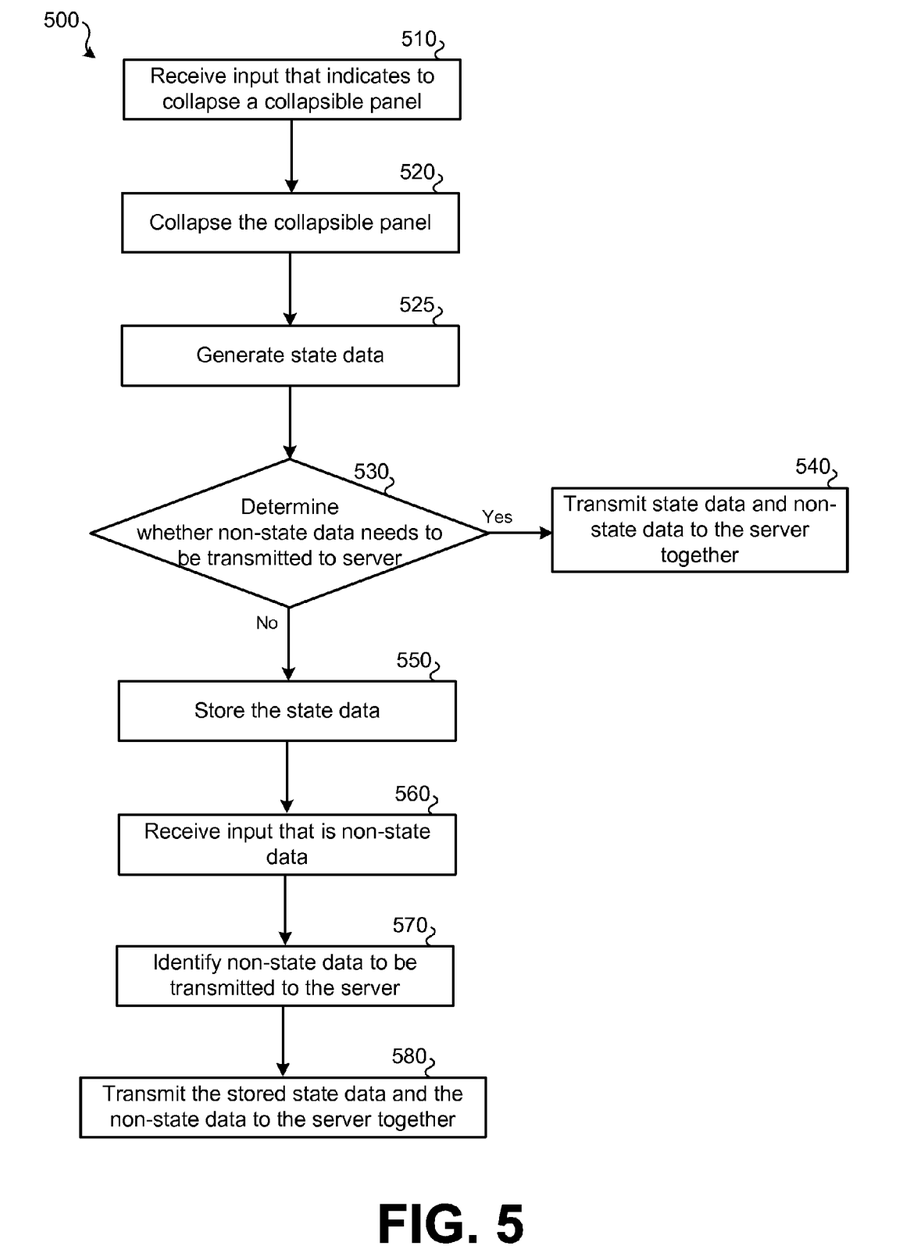
FIG. 5 illustrates another embodiment of a method for deferring a data post linked with collapsing a collapsible display panel that is expanded.

FIG. 5 illustrates another embodiment of a method 500 for deferring a data post related to collapsing a collapsible display panel. Method 500 may be performed by system 100. Method 500 may also be performed by some other system for deferring a data post related to a collapsible display panel. Each step of method 500 may be performed by a computerized device, such as a computer system or mobile device, operated by a user. Method 500 may represent a more detailed embodiment of method 400. Alternatively, method 500 may represent a separate method from method 400.

At step 510, input may be received that indicates a collapsible panel is to be collapsed. The collapsible panel may be present within a webpage being displayed to a user in a browser. This input may be received from the user. For example, referring to browser 300 of FIG. 3, by a user clicking on indicator 310, the user may have provided input that indicates that collapsible panel 210 is to be collapsed.

At step 520, the collapsible panel may be collapsed. The collapsible panel may be collapsed due to the input received from the user at step 510 that indicates the collapsible panel is to be collapsed. Collapsing the collapsible panel may involve a portion of a dataset associated with the collapsible panel no longer being displayed. A title of the collapsible panel may remain displayed when the collapsible panel is collapsed.

At step 525, state data may be generated. The state data may include an indication of the collapsible panel and an indication that the state the collapsible panel has been set to collapsed.

At step 530, a determination may be made whether non-state data needs to be transmitted to the server. Determining that non-state data needs to be transmitted to the server may involve determining if the user has added, modified, and/or deleted any data within the collapsible panel. As such, if the data linked with the collapsible panel stored by the server matches the non-state data displayed by the browser of the computerized device, no non-state data may need to be transmitted to the server; if data linked with the collapsible panel stored by the server does not match the non-state data displayed by the browser of the computerized device, non-state data may need to be transmitted to the server.

If non-state data is present to be transmitted to the server, method 500 may proceed to step 540. At step 540, the state data generated at step 525 and the nonstate data may be transmitted to the server together.

If no nonstate data is present to be transmitted to the server, method 500 may proceed to step 550. At step 550, the state change data generated at step 525 may be stored locally by the computerized device. For example, referring to FIG. 1, computer system 110 may be executing browser 150. State data that has not been transmitted to server 120 may be stored by state data cache 152. As such, despite state data having been generated and the collapsible panel being collapsed at step 520, no data is transmitted to the server because only state data is queued for transmission to the server. As such, at least since step 510 no data may have been transferred to the server.

At step 560, input may be received that constitutes non-state data. Such input may be received from the user of the computerized device. For example, the input may involve additions, deletions, or modifications to data present within another collapsible panel or another portion of the web page. As another example, the user may have attempted to reload the webpage, wherein the reload request would constitute non-state data. Other examples of non-state data may include a request for a different web page to be loaded and then returning to the initial web page, or the collapsible panel being within some other entity on the web page that is hidden, wherein user interaction may be used to restore the entity thus allowing for display of the collapsible panel. At step 570, the non-state data received at step 560 may be identified as needing to be transmitted to the server.

Once non-state change data has been identified at step 570 as needing to be transmitted to the server, the non-state data and the state data stored at step 550 may be transmitted to the server together. Once the state data stored at step 550 has been transmitted, the state data may be deleted from a state data cache of the computerized device.

In method 500, state change data related to one collapsible panel is stored at step 550 until transmission to the server at step 580 with non-state change data. In some embodiments, state change data related to multiple collapsible panels may be stored until non-state change data is identified to be transmitted to the server. For example, following step 550, method 500 may return to step 510. This may occur if the user has collapsed two collapsible panels and at least the first collapsible panel did not require any non-state data to be transmitted to the server. As such, multiple pieces of state change data, which may be related to multiple collapsible panels, may be transmitted to the server together with non-state change data.

Figure 6:
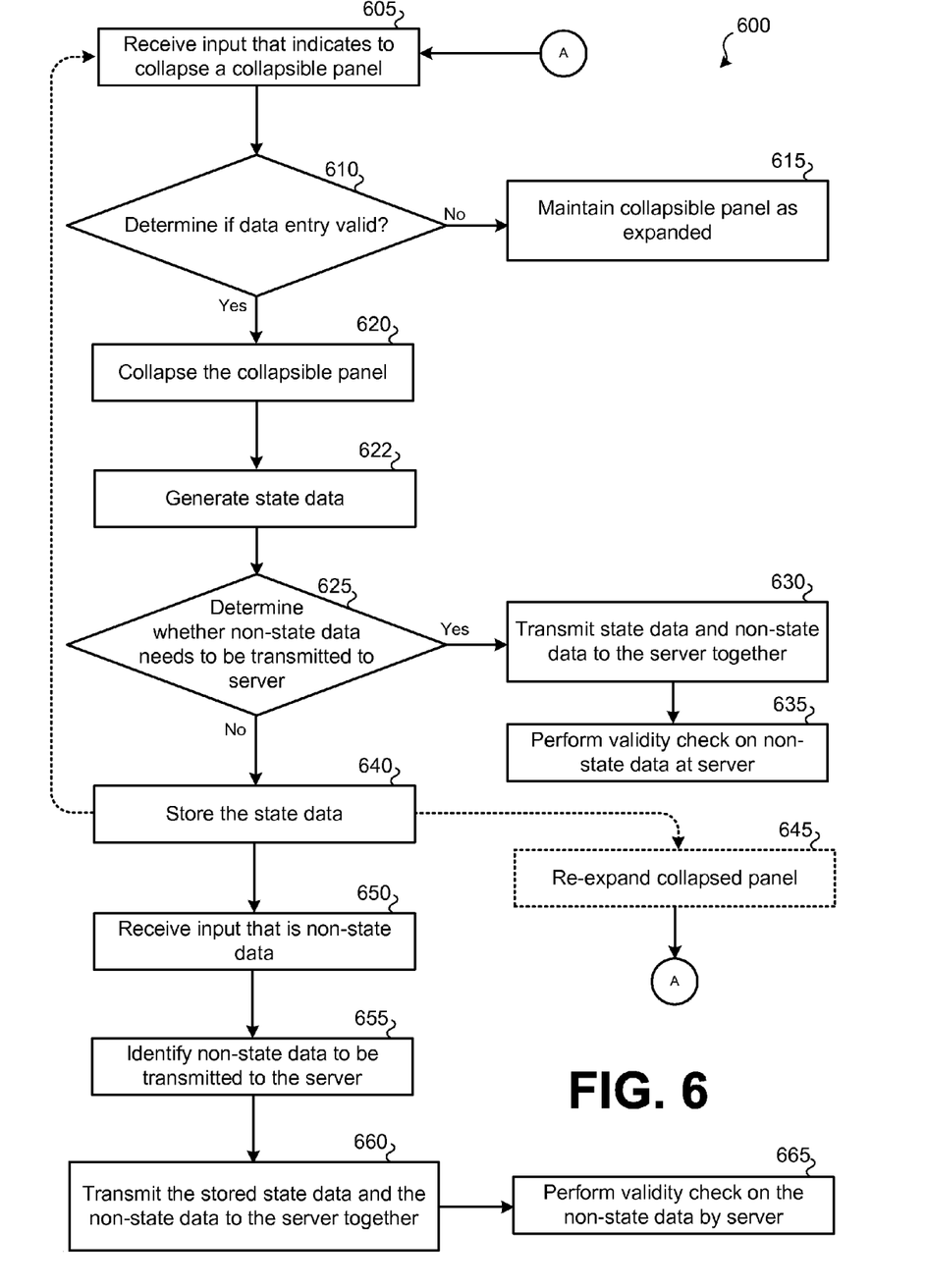
FIG. 6 illustrates another embodiment of a method for deferring a data post linked with collapsing a collapsible display panel that is expanded.

FIG. 6 illustrates another embodiment of a method 600 for deferring a data post related to collapsing a collapsible display panel. Method 600 may be performed by system 100. Method 600 may also be performed by some other system for deferring a data post related to a collapsible display panel. Each step of method 600 may be performed by a computerized device, such as a computer system or mobile device, operated by a user. Method 600 may represent a more detailed embodiment of method 400 and/or method 500. Alternatively, method 600 may represent a separate method from method 400 and method 500.

At step 605, input may be received that indicates a collapsible panel is to be collapsed. The collapsible panel may be present within a webpage being displayed to a user in a browser. This input may be received from a user. For example, referring to browser 300 of FIG. 3, by a user clicking on indicator 310, the user may have provided input that indicates collapsible panel 210 is to be collapsed.

At step 610, if data has been added, deleted, and/or modified by the user, a validity check may be performed on data provided by the user within the collapsible panel to determine if each data entry is valid. For example, if a data field within the collapsible panel requests a social security number, the data field may be checked to ensure that exactly nine numerical digits were provided. The validity check may vary according to the data that is expected to be received in each data field. In some embodiments, if a data field is left blank, the validity check may fail. This validity check, which may be performed local to the computerized device (without communication with the server) may check for a proper form of provided data, but may not check to see if data is valid. For example, a social security number may be verified to be the correct number of digits, but may not be checked for whether the provided number is an actual assigned social security number. If the validity check fails for one or more data fields within the collapsible panel, method 600 may proceed to step 615. At step 615, the collapsible panel may be maintained as expanded or re-expanded if it has been collapsed. The user may also be alerted which data fields failed the validity check.

If the validity check passes or no validity check was necessary (e.g., no modified, added, or deleted data), method 600 may proceed to step 620. At step 620, the collapsible panel may be collapsed. The collapsible panel may be collapsed due to the input received from the user at step 605 that indicates the collapsible panel is to be collapsed and the validity check being passed. Collapsing the collapsible panel may involve a portion of a dataset associated with the collapsible panel no longer being displayed to the user. Prior to step 605, a webpage may have been received by a computerized device from a server. The webpage may have one or more collapsible panels, each panel allowing for the display of a portion of a dataset. A title of the collapsible panel may remain displayed when the collapsible panel is collapsed.

At step 622, state data may be generated. The state data may include an indication of the collapsible panel and an indication of the state the collapsible panel has been set to (e.g., collapsed).

At step 625, a determination may be made whether non-state data needs to be transmitted to the server. Determining that non-state data needs to be transmitted to the server may involve determining if user has added, modified, and/or deleted any data within the collapsible panel. As such, if the data linked with the collapsible panel stored by the server matches the non-state data displayed by the browser of the computerized device, no non-state data may need to be transmitted to the server; if data linked with the collapsible panel stored by the server does not match the non-state data displayed by the browser of the computerized device, non-state data may need to be transmitted to the server. Determining whether non-state data needs to be transmitted to the server may be performed as part of the validity check of step 610.

If non-state data is present to be transmitted to the server, method 600 may proceed to step 630. At step 630, the state data generated at step 622 and the non-state data may be transmitted to the server together. At step 635, another validity check may be performed remotely by the server. This validity check may be performed to determine if the various input (e.g., non-state data) provided by the user is valid. This validity check may determine if the input provided is substantively valid. For example, a social security number may be checked to verify that it is an actual social security number issued by the government. If the validity check fails, the user may be notified as such and prompted to correct the input that failed the validity check. Following non-state data related to the collapsible panel being transferred to the server, if the user reexpands the collapsible panel, the portion of the dataset linked with the collapsible panel may need to be transferred from the server to the computerized device.

If no non-state data is present to be transmitted to the server, method 600 may proceed to step 640. At step 640, the state change data generated at step 622 may be stored locally by the computerized device. For example, referring to FIG. 1, computer system 110 may be executing browser 150. State data that has not been transmitted to server 120 may be stored by state data cache 152. As such, despite state data having been generated and the collapsible panel being collapsed at step 620, no data is transmitted to the server because only state data is queued for transmission to the server.

At step 645, the user may, optionally, re-expand the same collapsible panel. If the user provides such input, the collapsed panel may be re-expanded. The stored state data of step 640 linked with the collapsible panel may be deleted or modified to reflect that the collapsible panel has been expanded.

Since all of the data related to the collapsible panel may already be present at the computerized device, no communication with the server may be necessary to re-expand the collapsible panel. As such, if input is received that results in the collapsible panel being re-expanded, the collapsible panel may be re-expanded and the method may return to step 605 upon input being received that re-collapses the collapsible panel.

Also, dependent on user input, if an additional collapsible panel is collapsed by the user following step 640, method 600 may return to step 605. As such, multiple instances of state data may be stored at the same time. Such multiple instances of state data may be transmitted to the server together, such as at step 660 or at step 630.

At step 650, input may be received that constitutes non-state data. Such input may be received from the user of the computerized device. For example, the input may involve additions, deletions, or modifications to data present within some other collapsible panel or to another portion of the web page. At step 655, the non-state data received at step 650 may be identified as needing to be transmitted to the server.

Once non-state change data has been identified at step 655 as needing to be transmitted to the server, the non-state data and the state data stored at step 640 may be transmitted to the server together. Once the state data stored at step 640 has been transmitted, the state data may be deleted from the computerized device.

At step 665, a validity check may be performed on the non-state data received by the server. This validity check may be the as or similar to the same validity check performed at step 635. This validity check may be performed by the server to determine if the various input (e.g., non-state data) provided by the user is valid. This validity check may determine if the input provided is substantively valid. For example, a social security number may be checked to verify that it is an actual social security number issued by the government.

If at a point during method 600 the display state of the collapsible panels becomes corrupt, the last known good state may be returned to.

Figure 7:
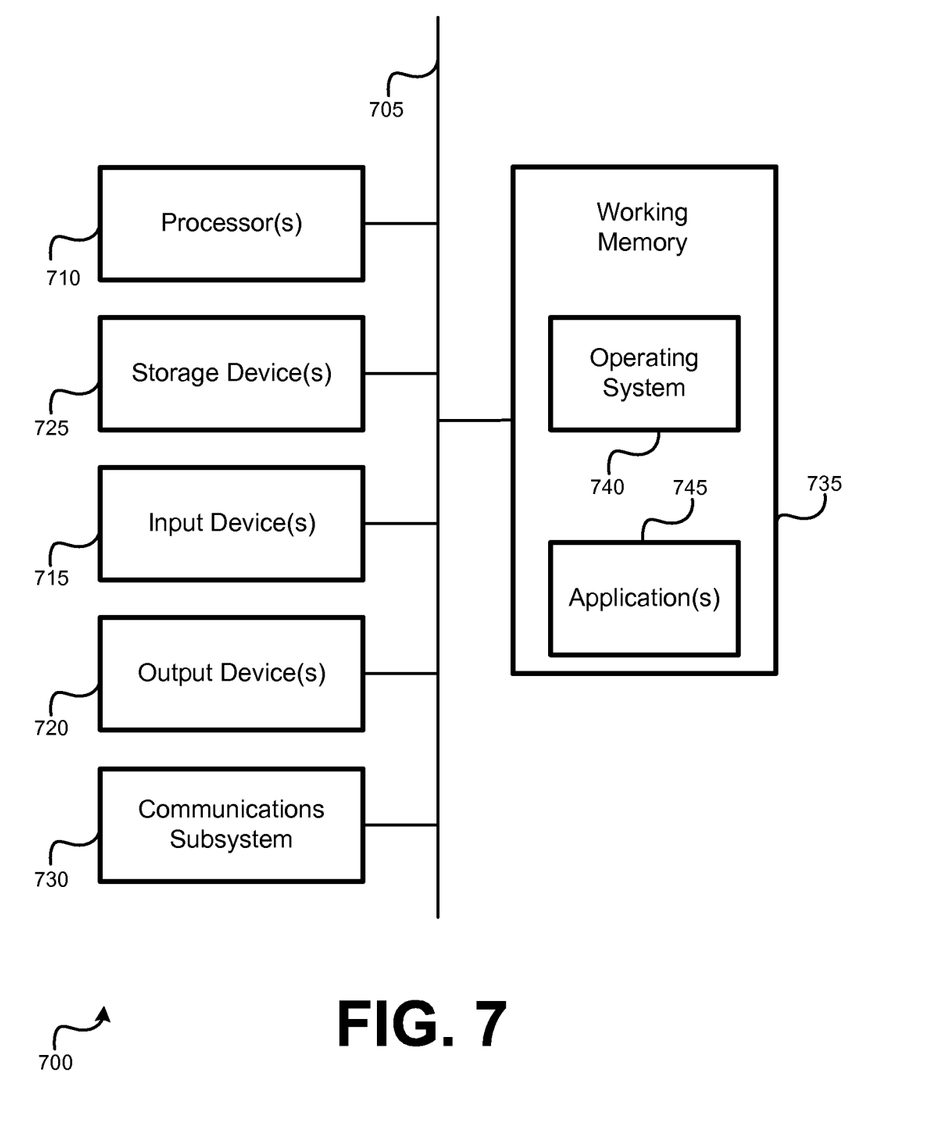
FIG. 7 illustrates an embodiment of a computer system.

A computer system as illustrated in FIG. 7 may incorporate as part of the previously described computerized devices. For example, computer system 700 can represent some of the components of the mobile devices, computer systems, computerized devices, and/or servers discussed herein. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard and/or the like; and one or more output devices 720, which can include without limitation a display device, a printer and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor(s) 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on non-transitory storage device(s) 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for handling transmission of data related to a collapsible display panel, the method comprising:
    collapsing the collapsible display panel;
    generating state data that indicates the collapsible display panel has been collapsed;
    determining that only the state data is pending transmission to a server;
    in response to determining that only the state data is pending transmission to the server, storing, by a computerized device, the state data at least until non-state data is to be transmitted to the server;
    after storing the state data and before the non-state data is to be transmitted to the server, reexpanding the collapsible display panel; and
    in response to reexpanding the collapsible display panel, modifying the stored state data.

2. The method for handling transmission of data related to the collapsible display panel of claim 1, wherein modifying the stored state data comprises deleting the stored state data.

3. The method for handling transmission of data related to the collapsible display panel of claim 1, further comprising:
    outputting for presentation the collapsible display panel within a webpage presented in an Internet browser.

4. The method for handling transmission of data related to the collapsible display panel of claim 3, wherein reexpanding the collapsible display panel involves no data retrieval from the server for the collapsible display panel.

5. The method for handling transmission of data related to the collapsible display panel of claim 3, further comprising:
    receiving the webpage from the server.

6. The method for handling transmission of data related to the collapsible display panel of claim 1, wherein:
    collapsing the collapsible display panel is performed in response to a first user input; and
    reexpanding the collapsible display panel is performed in response to a second user input.

7. The method for handling transmission of data related to the collapsible display panel of claim 1, wherein the non-state data comprises data input by a user.

8. The method for handling transmission of data related to the collapsible display panel of claim 1, further comprising transmitting the state data to the server.

9. A system for handling transmission of data related to a collapsible display panel, the system comprising:
one or more processors; and
a memory communicatively coupled with and readable by the one or more processors and having stored therein processor-readable instructions which, when executed by the one or more processors, cause the one or more processors to:
collapse the collapsible display panel;
generate state data that indicates the collapsible display panel has been collapsed;
determine that the only state data is pending transmission to a server;
in response to determining that only the state data is pending transmission to the server, store the state data at least until non-state data is to be transmitted to the server;
after storing the state data and before the non-state data needs to be transmitted to the server, reexpand the collapsible display panel; and
in response to reexpanding the collapsible display panel, modify the stored state data.

10. The system for handling transmission of data related to the collapsible display panel of claim 9, wherein the processor-readable instructions that, when executed, cause the one or more processors to modify the stored state data comprise processor-readable instructions which, when executed, cause the one or more processors to delete the stored state data.

11. The system for handling transmission of data related to the collapsible display panel of claim 9, wherein the processor-readable instructions, when executed, further cause the one or more processors to:
cause the collapsible display panel to be displayed within a webpage presented in an Internet browser.

12. The system for handling transmission of data related to the collapsible display panel of claim 11, wherein reexpanding the collapsible display panel involves no data retrieval from the server for the collapsible display panel.

13. The system for handling transmission of data related to the collapsible display panel of claim 11, wherein the processor-readable instructions are further configured to cause the one or more processors to receive the webpage from the server.

14. The system for handling transmission of data related to the collapsible display panel of claim 9, wherein the processor-readable instructions that, when executed, cause the one or more processors to collapse the collapsible display panel are performed in response to a first user input; and the processor-readable instructions that, when executed, cause the one or more processors to reexpand the collapsible display panel is performed in response to a second user input.

15. The system for handling transmission of data related to the collapsible display panel of claim 9, wherein the non-state data comprises data input by a user.

16. The system for handling transmission of data related to the collapsible display panel of claim 9, wherein the processor-readable instructions, when executed, further cause the one or more processors to transmit the state data to the server.

17. A non-transitory processor-readable medium for handling transmission of data related to a collapsible display panel, comprising processor-readable instructions configured to cause one or more processors to:
collapse the collapsible display panel;
generate state data that indicates the collapsible display panel has been collapsed;
determine that only the state data is pending transmission to a server;
in response to determining that only the state data is pending transmission to the server, store the state data at least until non-state data is to be transmitted to the server;
after storing the state data and before the non-state data needs to be transmitted to the server, reexpand the collapsible display panel; and
in response to reexpanding the collapsible display panel, modify the stored state data.

18. The non-transitory processor-readable medium for handling transmission of data related to the collapsible display panel of claim 17, wherein the processor-readable instructions configured to cause the one or more processors to modify the stored state data comprise processor-readable instructions configured to cause the one or more processors to delete the stored state data.

19. The non-transitory processor-readable medium for handling transmission of data related to the collapsible display panel of claim 17, wherein the processor-readable instructions are further configured to cause the one or more processors to:
cause the collapsible display panel to be displayed within a webpage presented in an Internet browser.

20. The non-transitory processor-readable medium for handling transmission of data related to the collapsible display panel of claim 19, wherein reexpanding the collapsible display panel involves no data retrieval from the server for the collapsible display panel.

* * * * *